United States Patent
Takahashi

[11] Patent Number: 5,822,144
[45] Date of Patent: Oct. 13, 1998

[54] APPARATUS AND METHOD FOR ADJUSTING POSITIONAL SENSITIVITY OF DISK UNIT

[75] Inventor: Eisaku Takahashi, Higashine, Japan

[73] Assignee: Fujitsu Limited, Kawasaki, Japan

[21] Appl. No.: 567,489

[22] Filed: Dec. 5, 1995

[30] Foreign Application Priority Data

Apr. 20, 1995 [JP] Japan ................................. 7-095106

[51] Int. Cl.$^6$ ........................................................ G11B 5/02
[52] U.S. Cl. ................... 360/67; 360/77.08; 360/77.04; 360/78.14
[58] Field of Search ................... 360/67, 77.02, 360/77.08, 77.04, 77.05, 78.14, 78.04, 65, 46, 75

[56] References Cited

U.S. PATENT DOCUMENTS 5,541,785  7/1996  Sasamoto ............... 360/77.05

FOREIGN PATENT DOCUMENTS 05210926  8/1993  Japan .

*Primary Examiner*—Aristotelis M. Psitos
*Assistant Examiner*—Alan Faber
*Attorney, Agent, or Firm*—Greer, Burns & Crain, Ltd.

[57] ABSTRACT

Two position signals N and Q having phases different by 90° are demodulated from discrete readout signals of two-phase servo information through a position signal demodulating circuit. A level detecting circuit compares sizes of two position signals (absolute values) N and Q discretely available from the position signal demodulating circuit through seek operation at a certain speed. A cross-point C is calculated on the basis of two smaller discrete values Z and Y immediately prior to reversal of the size relationship of the two signals at the cross-point and a smaller discrete value X immediately after passage through the cross-point, and the thus calculated cross-point value C is set in an AGC amplifier as a reference amplitude value. The AGC amplifier adjusts the positional sensitivity to a certain value by amplifying the cross-point level of the two position signals N and Q so as to agree with the set reference amplitude value.

11 Claims, 11 Drawing Sheets

F I G. 8
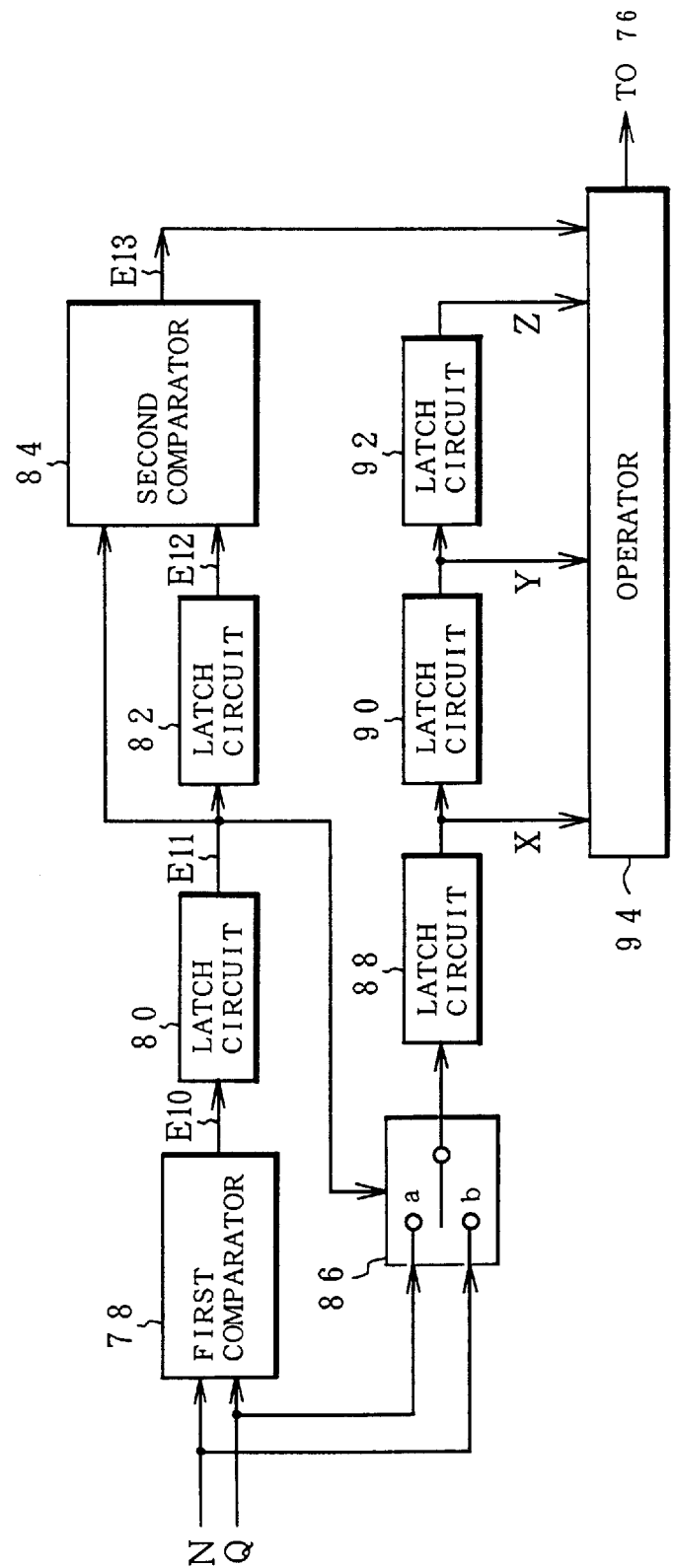

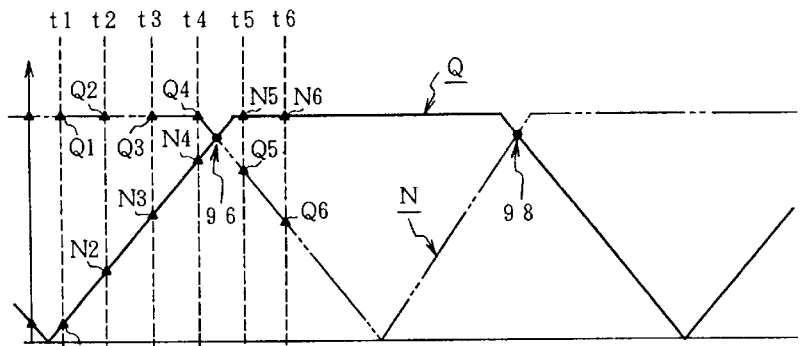
FIG. 9A
FIG. 9B
LEVEL
COMPARATOR 78
OUTPUT E10
(LATCH OUTPUT E11)
FIG. 9C
LATCH
CIRCUIT 82
OUTPUT E12
FIG. 9D
COMPARATOR
OUTPUT E13
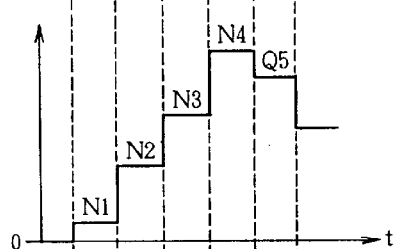
FIG. 9E
LATCH CIRCUIT
OUTPUT X
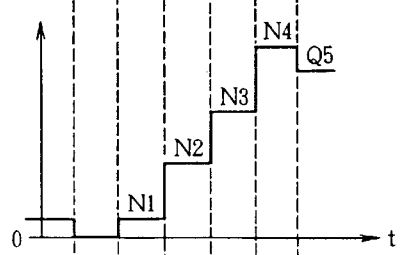
FIG. 9F
LATCH CIRCUIT
OUTPUT Y
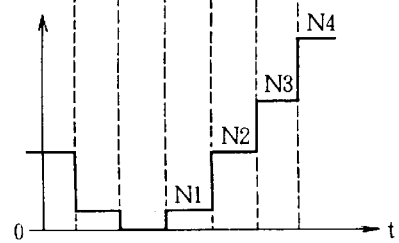
FIG. 9G
LATCH CIRCUIT
OUTPUT Z

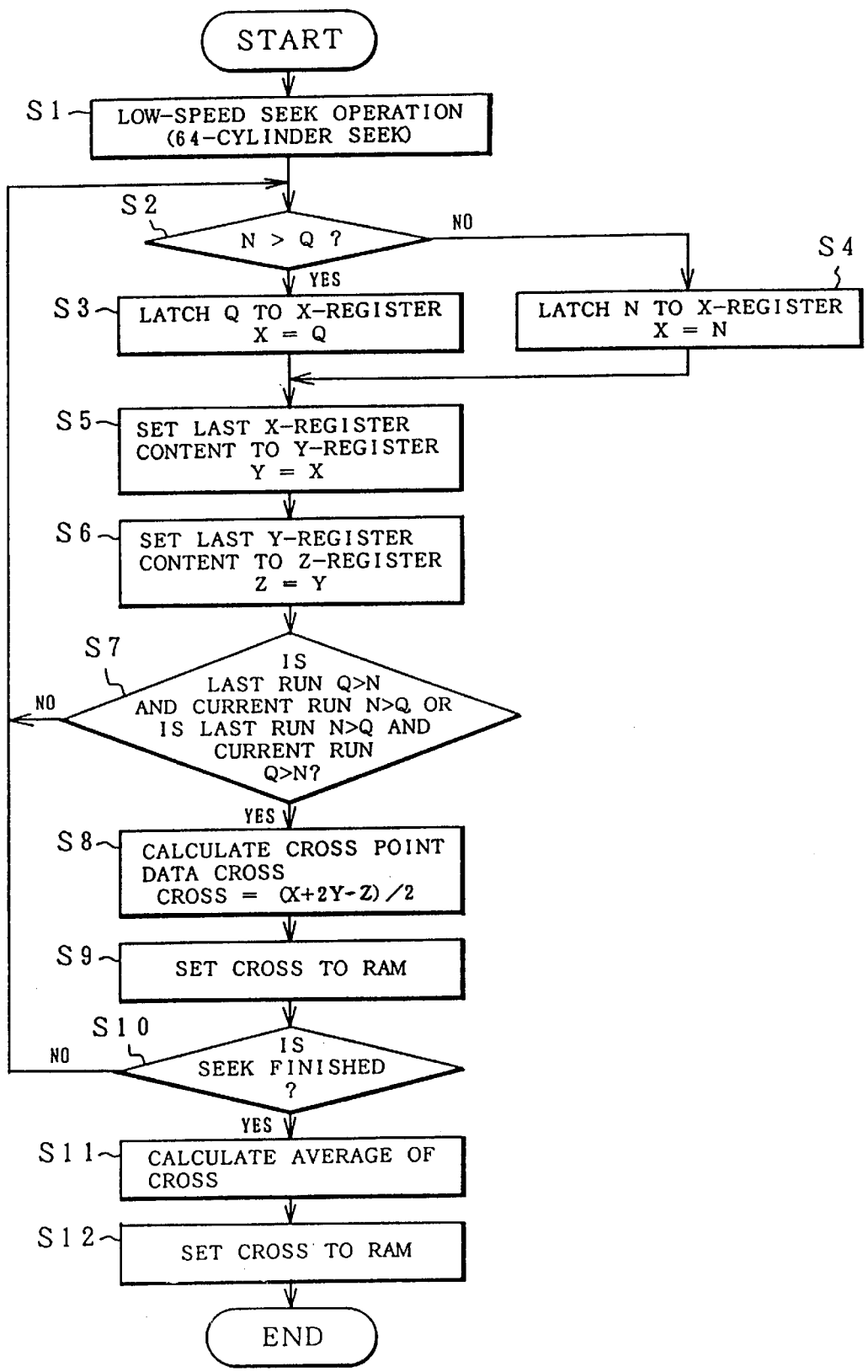

APPARATUS AND METHOD FOR ADJUSTING POSITIONAL SENSITIVITY OF DISK UNIT

BACKGROUND OF THE INVENTION

The present invention relates to a disk unit which demodulates a position signal of a head using two-phase servo information embedded before the start of a data section on a data disk surface. More particularly, the present invention relates to an apparatus and a method for adjusting the positional sensitivity of a disk unit which adjust the signal amplitude of position signals to a cross-point level derived from two position signals demodulated from two-phase information.

Along with the recent tendency toward a larger capacity and a smaller size of magnetic disk units, the track density (TPI) is increasingly becoming higher, and improvement of the positioning accuracy based on servo signals for the achievement thereof is accordingly becoming more important. In contrast to the conventional dedicated servo surface requiring a servo surface and a servo head, a servo sector containing servo information is embedded before the start of a data sector on a disk surface which is favorable in cost and permits increase in the recording capacity. Known as the data surface servo, this system is now commonly adopted. When recording two-phase servo information in a servo disk or a servo sector, two position signals N and Q having phases different by 90° are demodulated from servo signals read out from a disk medium, and seek operation through coarse control of the head actuator and positioning operation of the head through fine control are conducted by means of these position signals N and Q. Since these two position signals N and Q demodulated from the two-phase servo information represent the head position with their signal levels, the two position signals N and Q finally demodulated should always have constant amplitudes at the head position at a cross-point level where the N and Q signals are in agreement. For this purpose, positional sensitivity adjustment is performed by moving the head at a low speed upon setup of the apparatus, detecting and storing the cross-point level where the two position signals are in agreement, and setting this cross-point level in an AGC amplifier as a reference amplitude value, thereby always keeping the two position signals N and Q at a constant level relative to the head position. In order to improve the positioning accuracy of the head, therefore, positional sensitivity adjustment must be accomplished accurately.

FIG. 1 shows a conventional positional sensitivity adjusting circuit for a servo dedicated disk surface. When adjusting the positional sensitivity, a VCM is moved at a low speed to demodulate two position signals N' and Q' having phases different by 90° from signals read out from two-phase servo information of the servo face. These demodulated signals are amplified by AGC amplifiers 102 and 104, and then converted into absolute position signals N and Q through absolute value circuits 106 and 108, which are sent to a cross-point level detecting circuit 110.

In FIG. 2A, the position signals N and Q put out from the AGC amplifiers 102 and 104 are converted into absolute position signals N and Q as shown in FIG. 2B through the absolute value circuits 106 and 108. The cross-point level detecting circuit 110 compares the absolute position signals N and Q shown in FIG. 2B, detects the signal levels at cross-points 114, 116, 118, 120 . . . where both of the signals are in agreement, and causes a memory 112 to store the average value thereof as a cross-point value C. The cross-point signal C stored and held in the memory 112 of FIG. 1 is set as a reference amplitude value in the AGC amplifiers 102 and 104 shown in FIG. 1 to control gain of the AGC amplifiers 102 and 104 so that the two position signals N and Q agree with this cross-point value C. Such adjustment of positional sensitivity keeps the cross-point level where the absolute position signals N and Q are in agreement at a constant value, and keeps a constant corresponding relationship between the head position and the position signal level, thus permitting high-accuracy positional detection.

In a magnetic disk unit with servo sectors having two-phase servo information built in at the start of the sector the data area is increased by reducing the area for building in two-phase servo information. The two position signals N and Q demodulated from servo readout signals are therefore discrete, resulting in a smaller volume of information. As a result, when the VCM is to be moved at a low speed for the purpose of adjusting the positional sensitivity, only discrete absolute signals N and Q are available as indicated by triangular spots in FIG. 3. In this case, a head almost never obtains the two position signals N and Q with a timing meeting the cross-points 114, 116, 118, 120 . . . where both signal levels are in agreement, thus making it impossible to detect cross-point levels precisely where both signal levels are in agreement. It is thus conceivable to approximately determine cross-point levels from an average value of discrete position signals N and Q before and after cross-points. However, when, for the cross-point 114 for example, discretely available position signals N and Q before and after the cross-point are at a saturation position at a different level from the straight portions of N and Q on a certain inclination, the difference between the average value and the actual cross-point level becomes excessively larger, thus making it impossible to accurately detect a cross-point level.

SUMMARY OF THE INVENTION

According to the present invention, there are provided an apparatus and a method for adjusting positional sensitivity of a disk unit, which, even for two discrete position signals available by a servo sector of a disk medium, permits high-accuracy adjustment of positional sensitivity through accurate detection of a cross-point where the two position signals are in agreement.

In the disk unit used in the present invention, two position signals N and Q having phases different by 90° are first demodulated from discrete readout signals of two-phase servo information embedded and recorded in servo sectors in between data sectors on a disk medium. To adjust the positional sensitivity to a constant level, level detecting means compares sizes of the signal levels (voltage) of the two position signals (absolute values) N and Q discretely available from the position signal demodulating means through seek operation at a certain speed. Then, a cross-point C is calculated and stored on the basis of two smaller discrete signal values Z and Y immediately prior to reversal of the size relationship of the signal values and a smaller discrete value X immediately after reversal. This cross-point value C detected by the level detecting means is set as a reference amplitude value for the AGC amplifying means, and amplified so that the cross-point level of the two position signals N and Q becomes equal to the thus set reference amplitude value.

The level detecting means comprises, for example, first comparing means which compares the levels of the two position signals, first latch means which holds the results of comparison of the first comparing means for two periods, selecting means which selects a smaller one of the two position signals N and Q on the basis of the results of comparison of the first comparing means, second latch means which holds the smaller one of the two position signals N and Q selected by the selecting means for three periods, second comparing means which compares the results of comparison for the two periods held in the first latch means and detects passage through the cross-point when the two results are not in agreement, and arithmetic operating means which, when receiving the detection output indicative of the passage through the cross-point from the second comparing means, calculates the cross-point value C by the use of the position signals Z, Y and X for the three periods held in the second latch means. The cross-point value C is calculated as:

$$C=(X+2Y-Z)/2$$

from the two position signals detected by the level detecting means. In this formula, from among the position signals X, Y and Z for the three latched periods, the position signal X represents the current period, the position signal Y represents the preceding period, and the position signal Z represents the period preceding Y. Further, the level detecting means should preferably determine an average value of a plurality of cross-point values detected during seek operation, and set same in the AGC amplifying means.

The level detecting means of the present invention may be achieved also by a processor. In this case, the processor comprises first comparing means which compares the levels of the two position signals N and Q, first latch means which holds the results of comparison of the first comparing means for two periods, selecting means which selects the smaller one of the two position signals N and Q on the basis of the results of comparison of the first comparing means, second latch means which holds the smaller position signal of the two position signals N and Q selected by the selecting means for three periods, second comparing means which compares the results of comparison held in the first latch means for two periods, and detects the passage through the cross-point when the comparison results are not in agreement, and arithmetic operating means which, upon receiving the detection output of cross-point passage from the second comparing means for three periods, calculates a cross-point value C by the use of position signals Z, Y and X for the three periods held in the second latch means in accordance with the following formula:

$$C=(X+2Y-Z)/2$$

and stores the value C in RAM.

The present invention further provides a method for adjusting the positional sensitivity of a disk unit which demodulates two position signals N and Q having phases different by 90° from discrete readout signals of two-phase servo information embedded in servo sectors and recorded in a disk medium. This method for adjusting the positional sensitivity comprises:

a cross-point detecting step of comparing relative sizes of two position signals N and Q discretely available through demodulation by seek operation at a certain speed and determining a cross-point value C on the basis of two smaller discrete values Z and Y immediately prior to reversal of the size relationship of signals N and Q and a smaller discrete value X immediately after reversal; and an AGC amplifying step of setting the cross-point value C in AGC amplifying means to amplify the voltage value of the two position signals N and Q so as to be equal to the cross-point value.

In this case, the cross-point detecting step is to compare levels of the two position signals N and Q, holding the results of comparison for two periods, and when the results of comparison for the two periods are not in agreement, detects the cross-point passage. Then, the smaller one of the two position signals N and Q is selected and stored for three periods, and upon detection of the cross-point passage, the cross-point value C is calculated using the position signals Z, Y and X held for the three periods. The value of cross-point of the two position signals is calculated as:

$$C=(X+2Y-Z)/2$$

In this case also, the cross-point detecting step should preferably comprise determining an average value of a plurality of cross-point values detected during seek operation to set the result in the AGC amplifying means.

According to the apparatus and the method for adjusting the positional sensitivity of a disk unit of the present invention, it is possible to determine an accurate cross-point level even from discrete position signals by using the smaller one of discrete position signals at two points before and one point after crossing of two position signals discretely demodulated by a sector servo, and to improve the positioning accuracy of a head while accurately keeping a constant relationship between the head position and the position signal level by AGC-amplifying the two position signals demodulated so as to agree with the cross-point level.

The above and other objects, features, and advantages of the present invention will become more apparent from the following detailed description with reference to the drawings.

BRIEF DESCRIPTION OF THE DRAWINGS

FIG. 8 is a block diagram of the cross-point level detecting circuit shown in FIG. 4;

FIGS. 9A to 9G are time charts illustrating signal waveforms at various portions of the cross-point level detecting circuit shown in FIG. 8;

FIG. 11 is a flowchart of cross-point detecting processes by the MPU shown in FIG. 10.

DETAILED DESCRIPTION OF THE PREFERRED EMBODIMENTS

Figure 1:
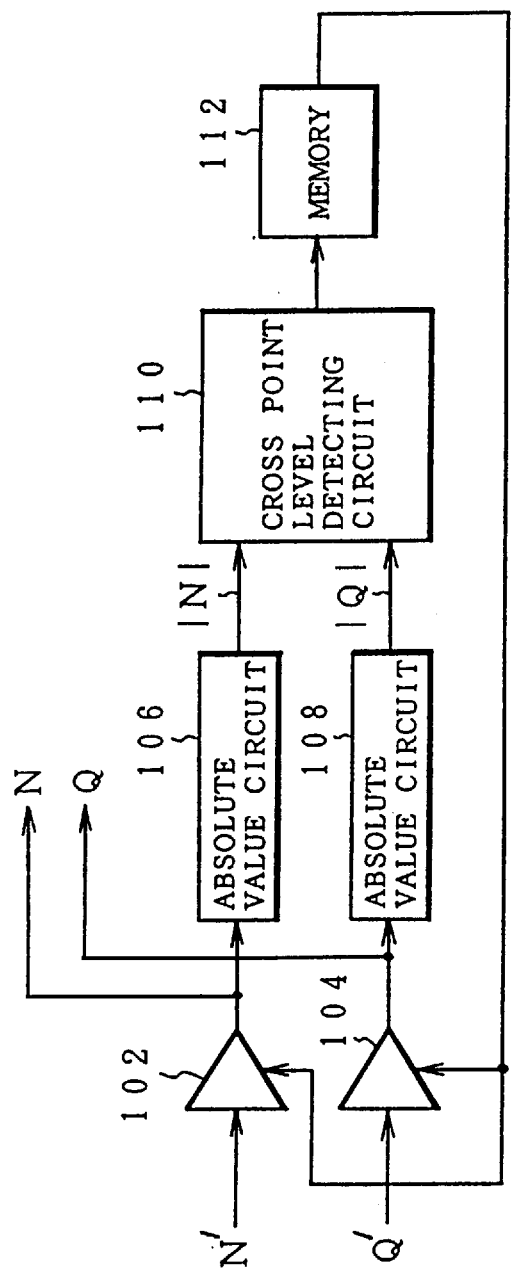
FIG. 1 is a block diagram of a conventional apparatus.
Figure 2:
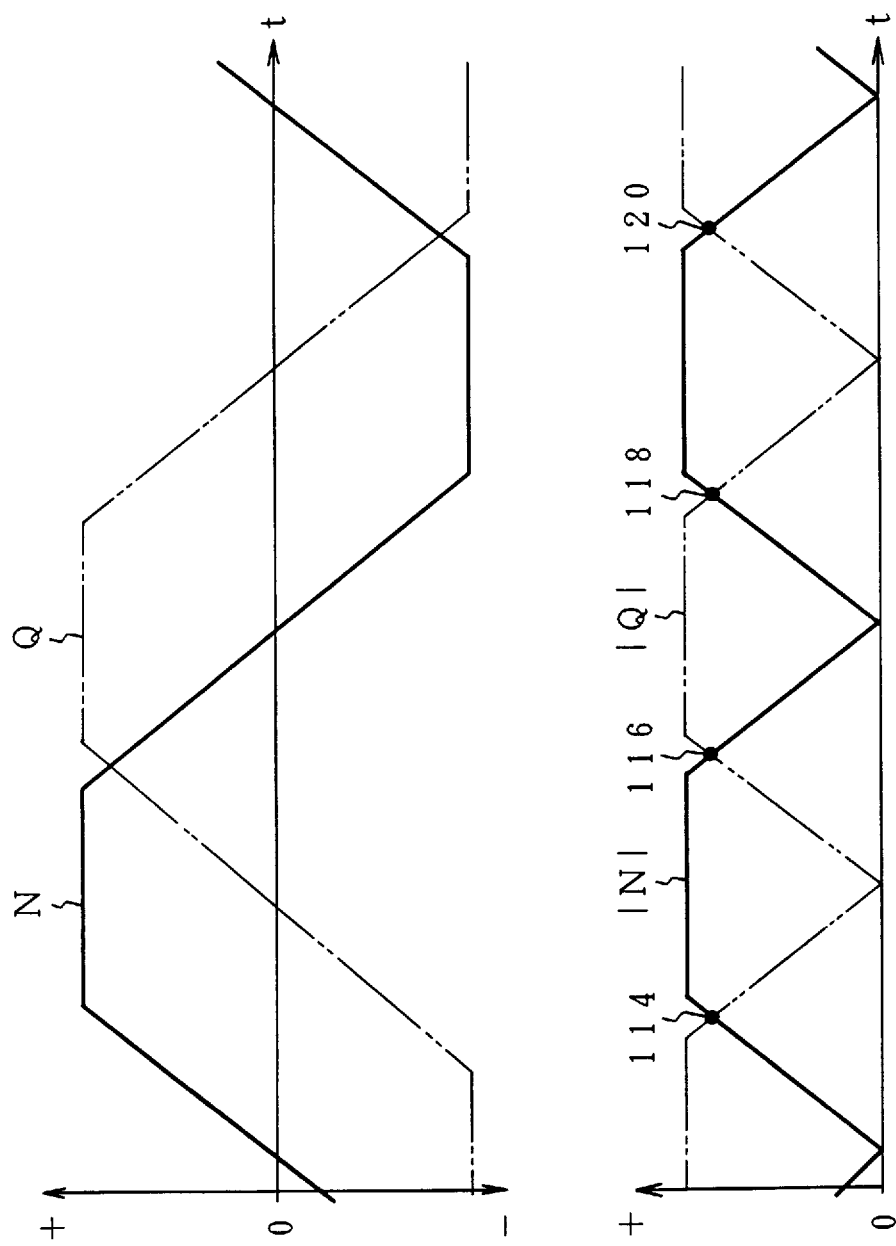
FIGS. 2A and 2B are time charts of two-phase servo position signals demodulated from a dedicated servo disk surface.
Figure 3:
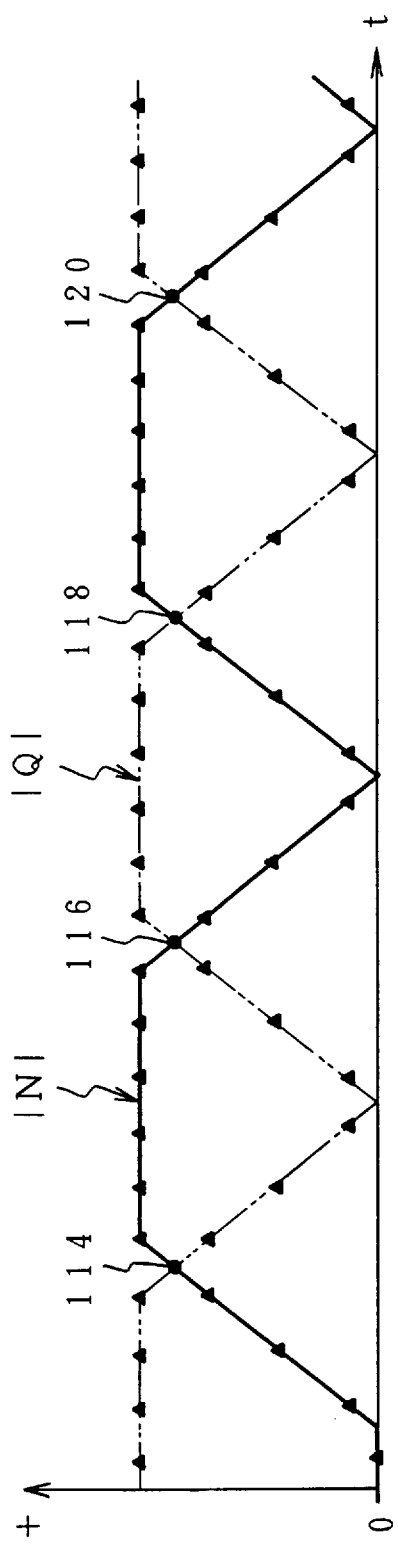
FIG. 3 is a time chart of discrete two-phase servo position signals demodulated from a sector servo.
Figure 4:
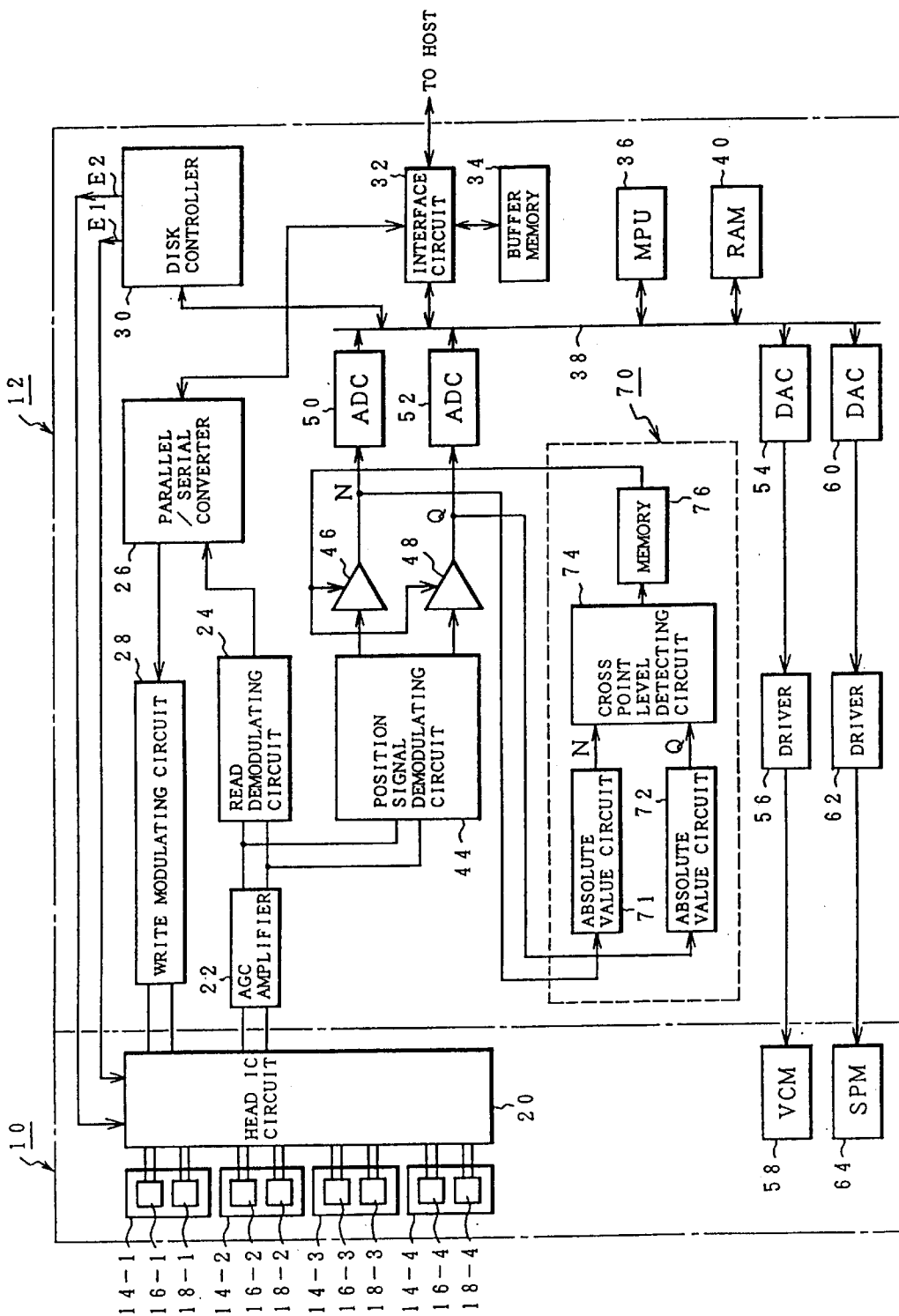
FIG. 4 is a block diagram illustrating an embodiment of the present invention.

FIG. 4 is a block diagram of a magnetic disk unit to which the positional sensitivity adjusting apparatus of the present invention is applicable. The disk unit known as a disk drive is composed of a disk enclosure 10 and a disk controller 12. The disk enclosure 10 is provided with a head IC circuit 20, and in this embodiment, four composite type heads 14-1 to 14-4 are connected to the head IC circuit 20. The composite type heads 14-1 to 14-4 have write heads 16-1 to 16-4 and read heads 18-1 to 18-4 integral therewith. Inductive heads are used as the write heads 16-1 to 16-4, and MR heads are employed as the read heads 18-1 to 18-4. The disk enclosure 10 is further provided with a VCM 58 which drives a head actuator and spindle motor 64 which rotates the magnetic disk.

Figure 5:
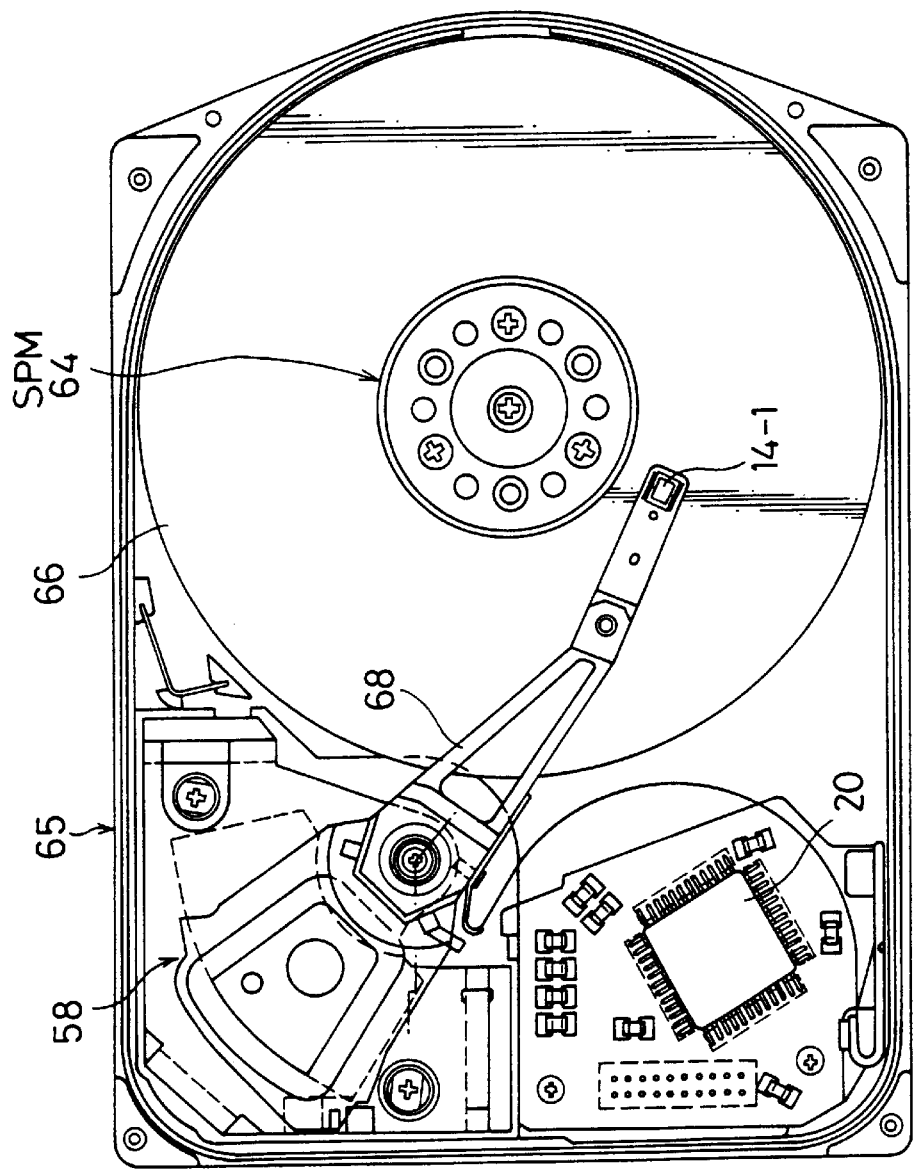
FIG. 5 is a constructional descriptive view of the disk unit of the present invention.

FIG. 5 shows a typical internal structure of the disk enclosure shown in FIG. 4. A magnetic disk 66 rotated by the spindle motor is provided in a cover 65 of the disk drive. Since, in this embodiment, the four composite type heads 14-1 to 14-4 are provided in the disk enclosure as shown in FIG. 4, two magnetic disks 66 are provided, thus giving four data faces. A head actuator 68 rotated by the VCM 58 is provided for the magnetic disks 66. The composite type head 14-1 is supported at the leading end of the head actuator 68. A head IC circuit 20 is mounted on a circuit board near the head actuator 68. The head IC circuit 20 is mounted on a flexible printed circuit board; and is electrically connected to the head actuator 68 with a band portion of the flexible printed circuit board.

Referring again to FIG. 4, read/write circuit sections and a servo circuit section for head positioning are provided in the disk controller 12 forming the circuit section of the disk enclosure 10. The read circuit is composed of an AGC amplifier 22 and a read demodulating circuit 24. Upon receipt of a signal validating a head switchover signal E1 and the read side of a read/write switchover signal E2 from a disk controller 30 based on a command from a host during read operation, the head IC circuit 20 selects any one of the composite type heads 14-1 to 14-4, and connects the thus selected read head to the AGC amplifier 22. When an MR head is used as a read head, the head IC circuit 20 causes sense current to flow to the MR head. After a readout signal from the read head is amplified by the AGC amplifier 22 to a prescribed amplitude, a read data is demodulated by the read demodulating circuit 24. The read demodulating circuit 24, comprising a partial response class-4 maximum-likelihood detector, for example, conducts (1+D) equalization at an equalizer circuit, and then demodulates bit data in the maximum-likelihood detecting circuit in accordance with Viterbi detection. The demodulated bit data is converted into an NRZ data by an RLL decoder, then converted into a parallel NRZ data by a parallel/serial converter 26, and transferred to a buffer memory 34 via an interface circuit 32. When the volume of storage of the buffer memory 34 becomes over a prescribed value, the read data is transferred from the interface circuit 32 to the host. The write modulating circuit 28 converts parallel write data from the host, transferred through the interface circuit 32 from the buffer memory 34 during write operation, into a serial NRZ data at the parallel/serial converter 26, enters the thus converted data, and first converts the data into an RLL code. Then, after precoding of 1/(1+D), the write modulating circuit 28 conducts write compensation, and after holding same at a write FF, feeds the data to a currently selected write head via the head IC circuit 20 by means of the driver to accomplish write operation into the disk medium. Overall control of the disk controller 12 is performed by an MPU 36. An RAM 40 is provided via a bus 38 for the MPU 36, and further, a disk controller 30 and an interface circuit 32 are connected to the MPU 36. The MPU 36 receives and decodes various commands from high-level controllers through the interface circuit 32, and performs read/write instruction to the disk controller 30 and head positioning control by the drive of a VCM 58 provided in the disk enclosure 10.

To drive the VCM 58, a DA converter 54 and a driver 56 are provided for a bus 38 to permit driving of the VCM 58 in response to an instruction from the MPU 36. A spindle motor 64 is driven by another DA converter 60 and another driver 62.

The position demodulating circuit section of the disk controller 12 comprises a position signal demodulating circuit 44, AGC amplifiers 46 and 48 and AD converters 50 and 52. In this embodiment, two-phase servo information is written into the magnetic disk 66 shown in FIG. 5 by a sector servo. A signal read out from the AGC amplifier 22 is entered into the position signal demodulating circuit 44, and demodulates the two position signals N and Q having phases different by 90° from the readout signal obtained at a timing of the servo frame. After the AGC amplifiers 46 and 48 amplify the position signals N and Q so as to have a prescribed positional sensitivity, the AD converters 50 and 52 convert these signals into digital data to feed the data to the MPU 36. On the basis of the two position signals obtained from the AD converters 50 and 52, the MPU 36 performs coarse control during seek operation and fine control upon the completion of seek. More specifically, in coarse control, the speed is determined through differentiation of each of the position signals N and Q by the use of the position signal N at the center position of the cylinder address, or the position signal Q at the boundary position of the cylinder address. On the basis of the number of remaining cylinders relative to the current target cylinder addresses, MPU 36 conducts speed control covering acceleration, constant speed and deceleration. When the current cylinder address agrees with the target cylinder address as a result of coarse control, processing is switched over to fine control and head positioning control is performed so that the currently available position signal N or Q is equal to the track center value.

A positional sensitivity detecting circuit 70 is provided for this two-phase servo information demodulating circuit section. The positional sensitivity detecting circuit 70 is composed of absolute value circuits 71 and 72, a cross-point level detecting circuit 74 and a memory 76. The absolute value circuits 71 and 72 put out absolute values of the two position signals obtained from the AGC amplifiers 46 and 48. Cross-point level detecting circuit 74 detects the level of a cross-point where levels of the two absolute position signals N and Q are in agreement for storage in the memory 76. In the case of a servo sector, the two position signals N and Q available from the position signal demodulating circuit 44 become discrete position signals. The absolute position signals N and Q for the cross-point level detecting circuit 74 also become discrete input signals. As to such discrete absolute position signals N and Q, the cross-point level detecting circuit 74 calculates the cross-point level through arithmetic operation based on discrete position signals available at two points before and one point after passage through the cross-point.

Figure 6:
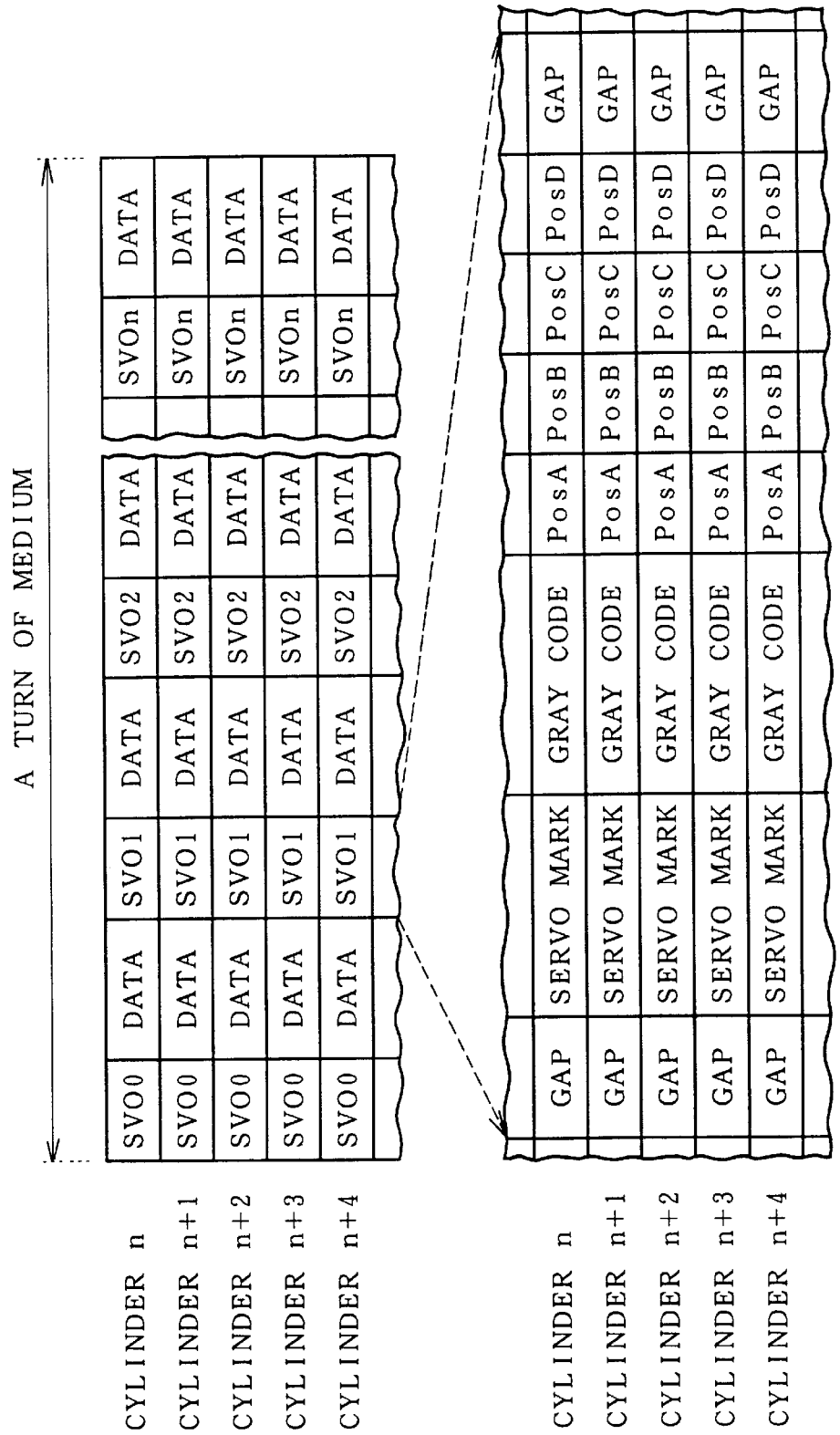
FIG. 6 is a descriptive view of the format of a sector servo in a disk medium.
Figure 7:
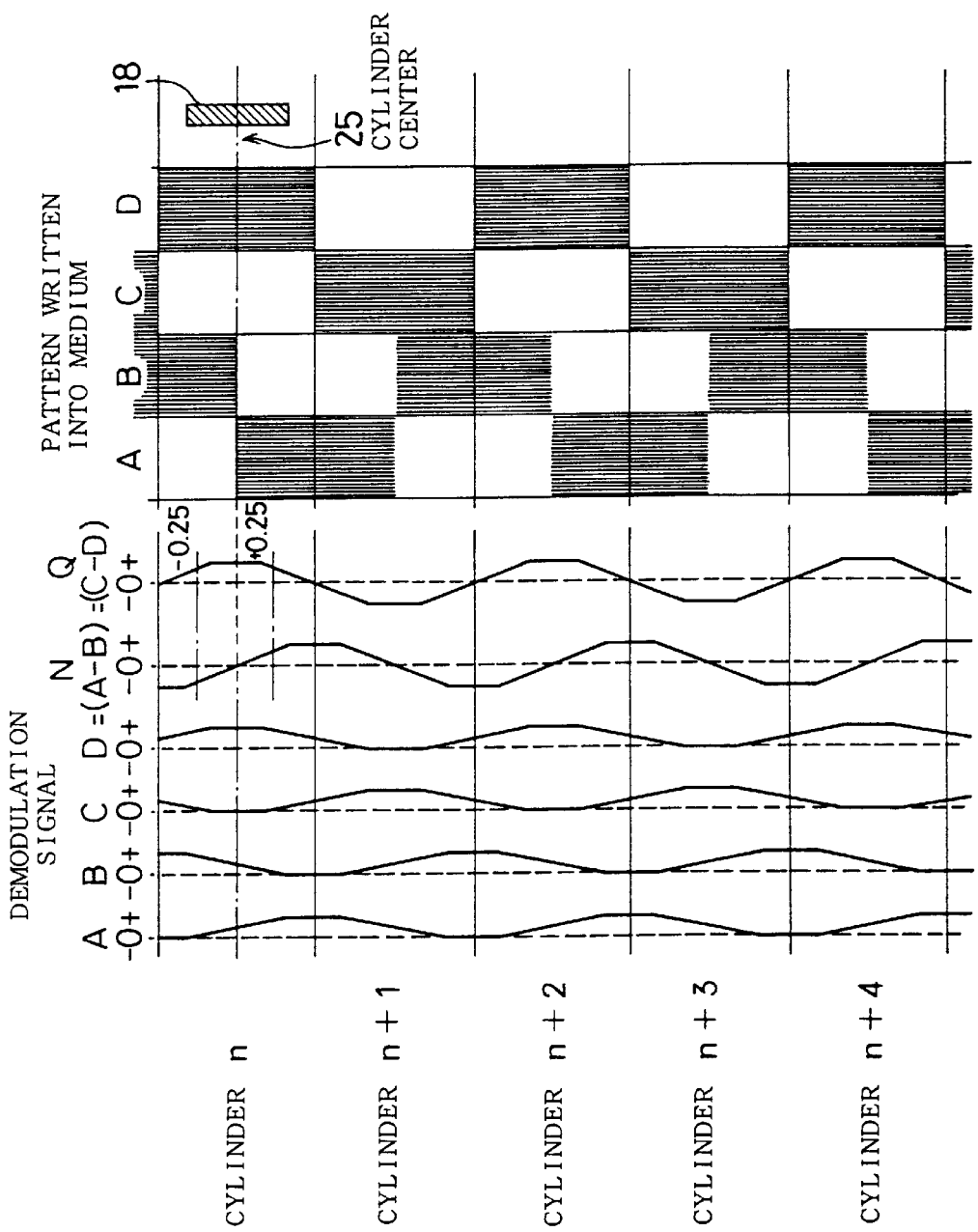
FIG. 7 is a descriptive view of demodulated position signals relative to a two-phase servo pattern and a head position recorded in the servo frame shown in FIG. 6.

Now, the format of the sector servo in the magnetic disk 66 shown in FIG. 5 will be described. FIG. 6 represents the track format for a turn of the medium for cylinders n to n+4 in the magnetic disk. In the cylinders n to n+4, a sector is composed of a servo frame SVO and a data frame DATA, and 0 to n sectors are provided. The servo frame comprises, as shown at the bottom of the drawing in an enlarged scale for the servo frame SV1, gaps, servo marks, gray codes, two-phase servo patterns as represented by Pos A, B, C and D, and more gaps. The servo mark indicates a starting position of the servo frame. The gray code represents a cylinder address. The two-phase servo patterns Pos A to D record servo patterns shown in the right-hand half of FIG. 7. More particularly, patterns of a frequency sufficiently higher than the recording frequency of data are recorded, with patterns A and B as a set, centering around the boundaries of the cylinders n, n+1, n+2, . . . having a 0.5 cylinder width on the both sides. Patterns C and D are recorded within the range of a width of 0.5 cylinders to the right and the left relative to the centers of the cylinders n, n+1, n+2 . . . with a shift of 0.5 cylinders from patterns A and B. For the two-phase servo pattern comprising these patterns A to D, demodulation signals A, B, C and D shown on the left are available by moving the read head 18 in the radial direction. The position signal N is available by determining the difference between these demodulation signals A and B. The position signal Q is available by determining the difference between the demodulated signals C and D. The position signal N is used within the range of, for example, ±0.5 cylinders from the cylinder center, and upon switchover, the position signal Q is used within the range of ±0.5 cylinders from the cylinder boundary.

FIG. 8 is a block diagram of the cross-point level detecting circuit 74 provided in the positional sensitivity detecting circuit 70 shown in FIG. 4. The cross-point level detecting circuit 74 shown in FIG. 8 comprises a first comparator 78, latch circuits 80 and 82 composing a first latch section, a second comparator 84, a selection switch circuit 86 serving as a selecting circuit, three latch circuits 88, 90 and 92 serving as a second latch circuit section, and an operator 94. The absolute position signals Q and N shown in FIG. 9A is entered from the absolute value circuits 71 and 72 in the first stage into the first comparator 78. When the position signal Q is larger than the position signal N, i.e., Q>N, the first comparator 78 causes an output signal E10 to take a value of 1, and when the position signal N is larger than the position signal Q, on the contrary, the first comparator 78 causes the comparison output E10 to take a value of 0. The latch circuit 80 latches the comparison output signal E10 at this point. The latch circuit 82 latches a comparison output signal E11 issued by the first comparator 78 during the period preceding the period of output from the latch circuit 80. The second comparator 84 compares latch outputs E11 and E12, respectively, from the latch circuit 80 and the latch circuit 82. More particularly, it compares the level comparator output E11 at the current point and the comparison output E12 from the first comparator 78 for the preceding period. If the two comparison outputs E11 and E12 are equivalent, the operation starting signal E13 to the operator 94 of the second comparator 84 is 0, meaning that operation starting is discontinued. When the latch signals E11 and E12 to the second comparator 84 are not in agreement, the operation starting signal E13 becomes 1, instructing the operator 94 to start arithmetic operation. Meanwhile, the position signals N and Q from the absolute value detecting circuits 71 and 72 have already been entered into the selection switch circuit 86. The selection switch circuit 86 is controlled by a level comparison output signal E11 for the current period as issued by the latch circuit 80, and selects the smaller position signal from among the position signals N and Q. For example, if the position signal Q is larger and the position signal N is smaller, the comparison output signal E10 of the first comparator 78 would have become 1. At this point, the selection switch circuit 86 has been switched over to the side b so that the smaller position signal N is selected by the latch output signal E11=1 from the latch circuit 80. When the position signal N is larger and the position signal Q is smaller, the comparison output signal E10 of the first comparator 78 becomes 0, and along with this, the latch output signal E11 of the latch circuit 80 is also 0. The selection switch circuit 86 has been switched over to the side a, because the smaller position signal Q is to be selected. The latch circuits 88, 90 and 92 sequentially latch the smaller one of the two position signals N and Q selected by the selection switch circuit 86 for each detection period. The smaller signals of two sets of position signals N and Q for the three consecutive periods beginning with the current period are thus held as position signals X, Y and Z. When the operation starting signal E13 from the second comparator 84 becomes 1, i.e., at an input timing of discrete position signals immediately after passage of the two position signals N and Q through the cross-point, the operator 94 is started, and at this point, determines the level of the cross-point C by using the position signals X, Y and Z for the three periods latched in the latch circuits 88, 90 and 92, setting same in the memory 76 of the following stage.

Now, the operations of the cross-point level detecting circuit 74 will be described below with reference to the time charts shown in FIGS. 9A to 9G. FIG. 9A illustrates the absolute position signals N and Q discretely obtained at timings of times t1 to t6 as N1 to N6 for N, and Q1 to Q6 for Q. At this point, N1 to N6 linearly increase, and are then saturated on a certain level. Q1 to Q6 linearly decrease, on the contrary, from a certain level. First, at the timing of time t1, the output E10 of the first comparator 78 takes a value of 1 as shown in FIG. 9B, since the position signal Q1 is larger than the position signal N1. Because this state has continued since before, the output E12 of the latch circuit 82 shown in FIG. 9C latching the comparison output for the preceding period is also 1. As both the latch outputs E11 and E12 of the two latch circuits 80 and 82 take a value of 1 at this point, the output E13 of the second comparator 84 becomes 0 as shown in FIG. 9D, discontinuing operation of the operator 94. Because the position signal Q1 is larger and the position signal N1 is smaller at time t1, on the other hand, the selection switch circuit 86 has been changed over to the side b and has selected the smaller position signal N1 on the basis of the output E11 of the latch circuit 80. This is latched by the latch circuit 88 at the timing of time t1, and the latch circuit output X shown in FIG. 9E becomes N1. In contrast, the outputs of the latch circuits 90 and 92 shown in FIGS. 9F and 9G have taken the values of the position signals N for the preceding and before preceding periods. The position signal N side is smaller than the position signal Q side at any of times t1 to t4. Therefore, the smaller position signals N1, N2, N3 and N4 are sequentially latched by the latch circuit 88 shown in FIG. 9E and sequentially latched in a similar manner by the latch circuit 90 shown in FIG. 9F and the latch circuit 92 shown in FIG. 9G with a lag of one period. During the period between times t4 and t5, it intersects the position signal N side at the point 96 as a result of a linear decrease in the position signal Q from time t4, and the size relationship between the position signals N and Q is reversed at the next time t5. As N5 is accordingly larger and Q5 is smaller at time t5, the output E10 of the first comparator 78 shown in FIG. 9B is reversed from 1 to 0. At this point, the output E12 of the latch circuit 82 shown in FIG. 9C still remains 1. The output E13 of the second comparator 84 shown in FIG. 9D therefore rises from 0 to 1, thus instructing the operator 94 to start operation. Consequently, X=Q5, Y=N4 and Z=N3 are held in the latch circuits 88, 90 and 92 in a new sequence as shown in FIGS. 9E, 9F and 9G.

The operator 94 calculates a value C for the cross-point 96 on the basis of these three position signals (X, Y, Z)=(Q5, N4, N3). The operator 94 calculates the cross-point C in accordance with the following formula:

$$C=(X+2Y-Z)/2$$

As is clear from FIG. 9A, the values of these X, Y and Z are the position signals N3 and N4 at two points immediately before the cross-point 96 of the position signals Q and N, and the position signal Q5 at one point immediately after the cross-point 96. This formula (1) for the calculation of the cross-point C can easily be derived as the solution to simultaneous equations of a straight line connecting points Z and Y and a straight line connecting point X and the point of intersection with the above straight line. Then, in a similar manner, the level C of the cross-point is calculated for the cross-points 96, 98 . . . of the two position signals Q and N shown in FIG. 9A. Then, after calculating levels of, for example, 64 cross-points, an average value thereof is determined to set the result on the memory 76. This detecting process of the cross-point level in the positional sensitivity detecting circuit 70 is performed as one of initialization processes upon setup comprising turning the power on for the disk unit. When conducting this cross-point level detecting process, a head moving state is created so as to drive the VCM 58 at a certain low speed, and the cross-point level C used for the adjustment of the positional sensitivity is determined from the position signals N and Q for 64 cylinders available in this head moving state.

Referring again to FIG. 4, the cross-point level C set in the memory 76 during the detecting process by the cross-point level detecting circuit 74 is set as a reference amplitude value common to the AGC amplifiers 46 and 48. The thus set reference amplitude value is to control the amplification gain so that the difference in level between the position signals N and Q output by the AGC amplifiers 46 and 48 upon demodulating the position signals becomes 0. In this case, the cross-point level can be used as the reference amplitude value only when the head is present at the cylinder position corresponding to the cross-point. This position is the one shifting by ±0.25 cylinders from the position signals N and Q toward the cylinder center in FIG. 7. It therefore suffices to adjust gain by the AGC amplifiers 46 and 48 at a timing when the head has moved to a position shifting by ±0.25 cylinders to the cylinder center. Such gain adjustment by the AGC amplifiers may appropriately be performed through setting of an adjustment mode based on a timer or the like separated from usual read and write operations.

Figure 10:
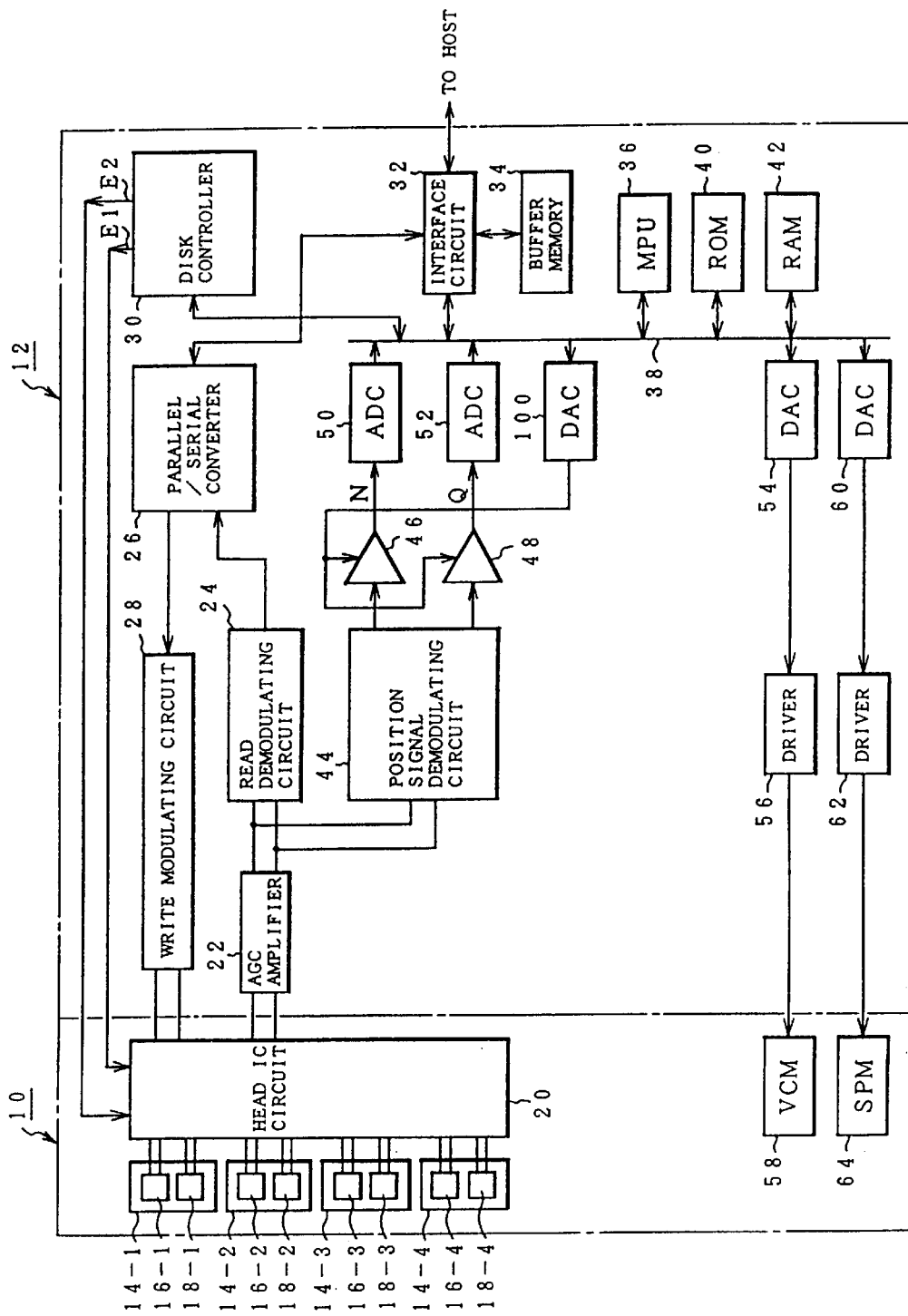
FIG. 10 is a block diagram of another embodiment of the present invention, wherein a cross-point detecting function is provided in the MPU.

FIG. 10 shows another embodiment of the disk unit of the present invention. This embodiment is characterized in that processing of the positional sensitivity detecting circuit 70 provided in the embodiment shown in FIG. 4 is accomplished through program control of the MPU 36. This feature eliminates the necessity of the positional sensitivity detecting circuit 70 of the disk controller 12, and there is provided a DA converter 100 on the bus 38, for setting a cross-point level value determined through cross-point level detecting process as a reference amplitude value for the AGC amplifiers 46 and 48. The cross-point level detecting process for adjustment of the positional sensitivity by the MPU 36 is performed in accordance with the flowchart shown in FIG. 11. First in step S1, seek operation is caused, for example, from the outer side toward the inner side, by driving the VCM 58 at a prescribed low speed. The seek distance in this case is set to, for example, 64 cylinders. Then in step S2, the position signals Q and N are compared in terms of relative sizes, and in steps S3 and S4, the smaller position signal is latched in a register X. More specifically, if the position signal Q is smaller, the position signal Q is latched in the register X in step S3, and if the position signal N is smaller, the position signal N is latched in the register X in step S4. In step S5, the contents of the register X so far held by a register Y are set to achieve Y=X. Further in step S6, the contents of the register Y of the preceding step are set in a register Z to achieve Z=Y. As a result of the processes of steps S3 to S6, the smaller ones of the two position signals Q and N for three consecutive points are held in the three registers X, Y and Z. Then in step S7, it is determined whether or not the fact is valid that the last position signal Q is larger and the current position signal N is larger, or the last position signal N is larger and the current position signal Q is larger. Since determination of this condition means that this is immediately after passage of the position signals N and Q through the cross-point, the cross-point data is calculated in step S8 by the use of the current contents of the registers X, Y and Z, and the result of calculation is set in the RAM in step S9. Then in step S10, it is checked if seek of, for example, predetermined 64 cylinders has been completed or not, and the processes of steps S2 to S10 are repeated until completion of seek. Upon the completion of seek of predetermined cylinders, an average value over a plurality of calculated cross-point data is calculated in step S11, and the result of calculation is set in the RAM in step S12. The result is set in the AGC amplifiers 46 and 48 through the DA converter 100 shown in FIG. 10 as a reference amplitude level.

According to the present invention, as described above, it is possible to accurately determine the level of a cross-point of two position signals even when they are discrete position signals by using the smaller one of discrete position signals for two points before and one point after crossing of the position signals for two position signals discretely demodulated by a sector servo, and to accurately keep a certain relationship between the head position and the demodulated position signals by AGC-amplifying the level of the cross-point of the two demodulated position signals so as to agree with the thus determined cross-point level, thereby improving the head positioning accuracy.

In the embodiment shown in FIG. 10, processing is performed by the MPU 36, but a digital signal processor (SDP) may be used in place of the MPU. The present invention is not limited to the above-mentioned embodiments, but appropriate variations are possible so far as the cross-point is calculated by using the smaller one of two position signals at two point before passage of the two position signals through the cross-point and at one point immediately after passage through the cross-point. The present invention is not limited by the numerical values shown in the embodiments.

What is claimed is:

1. An apparatus for adjusting the positional sensitivity of a disk unit, which comprises:

position signal demodulating means which demodulates two position signals N and Q, having a phase difference of 90°, from discrete readout signals of two-phase servo information recorded in servo sectors in a disk medium; and cross-point level detecting means which compares levels of the two position signals N and Q discretely available from said position signal demodulating means by a seek operation at a certain speed, and calculates a cross-point value C on the basis of two smaller discrete values Z and Y immediately prior to a reversal of the size relationship between said signals and a smaller discrete value X immediately after such reversal;

said cross-point level detecting means having a first comparing means which compares the levels of the two position signals N and Q and a first latch means which holds the comparison results of said first comparing means for two periods of a selected one of said position signals N and Q;

said cross-point level detecting means having a selecting means which selects a smaller one of the two position signals N and Q on the basis of the result of the comparison by said first comparing means, said cross-point level detecting means having a second latch means which holds the smaller position signals for three periods of a selected one of said two positions N and Q;

said cross-point level detecting means having a second comparing means which compares the comparison results held in said first latch means, and detects passage through the cross-point when the held results are not in agreement, and an operating means which, upon receipt of a detection output of passage through the cross-point by said second comparing means, calculates a cross-point value C by using position signals Z, Y and X for the three periods held in said second latch means;

said cross-point value C detected by said cross-point level detecting means being set in an AGC amplifier, so that the voltage values of said two position signals N and Q become amplified to said set value C.

2. An apparatus according to claim 1, wherein said cross-point level detecting means calculates said cross-point value C of the two position signals N and Q in accordance with a formula:

$$C=(X+2Y-Z)/2.$$

3. An apparatus according to claim 1, wherein said cross-point level detecting means determines an average value over a plurality of cross-point values detected during seek operation, and sets said average value in said AGC amplifying means.

4. An apparatus for adjusting the positional sensitivity of a disk unit, which comprises:

position signal demodulating means which demodulates two position signals N and Q, having a phase difference of 90°, from discrete readout signals of two-phase servo information recorded in a servo sector in a disk medium; and a processor having a cross-point level detecting means which compares size levels of the two position signals N and Q discretely available from said position signal demodulating means by a seek operation at a certain speed, calculates a cross-point value C on the basis of two discrete values Z and Y immediately prior to reversal of the size relationship between said signals and a discrete value X immediately after such reversal, and stores the resulting value C in a RAM, said cross-point level detecting means having a first comparing means which compares the levels of the two position signals N and Q and a first latch means which holds the results of comparison by said first comparing means for two periods of a selected one of said position signals N and Q;

said cross-point level detecting means having a selecting means which selects a smaller one of the two positions signals N and Q on the basis of the comparison result of said first comparing means and a second latch means which holds the smaller position signals for three periods of a selected one of said two positions N and Q;

said cross-point level detecting means having a second comparing means which compares the comparison results held in said first means, and when the held results are not in agreement, detects passage through the cross-point, and an operating means which, upon receipt of a detection output of passage through the cross-point by said second comparing means, calculates a cross-point value C by using position signals Z, Y and X held in said second latch means;

said cross-point value C detected by said cross-point level detecting means being set in an AGC amplifier so that the voltage values of said two position signals N and Q become amplified to said set value C.

5. An apparatus according to claim 4, wherein said cross-point level detecting means calculates said cross-point value C of the two position signals N and Q in accordance with a formula:

$$C=(X+2Y-Z)/2.$$

6. An apparatus according to claim 4, wherein said cross-point level detecting means determines an average value over a plurality of cross-point values detected during seek operation, and sets said average value in said AGC amplifying means.

7. A method for adjusting the positional sensitivity of a disk unit, which demodulates two position signals N and Q, having a phase difference of 90°, from discrete readout signals of two-phase servo information recorded in servo sectors in a disk medium, said method comprising:

a cross-point detecting step where a processor compares sizes of the signal level of two position signals N and Q during a seek operation of said disk medium, determines a cross-point value C on the basis of two discrete values Z and Y immediately prior to reversal of the size relationship of the N and Q signals, and a discrete value X immediately after said reversal, and stores the resulting value C in a RAM, wherein said cross-point detecting step comprises:

comparing levels of the two position signals N and Q, holding results of said comparison for two periods of a selected one of said two position signals N and Q, and detecting passage through said cross-point when the results of comparison for said two periods are not in agreement, and selecting the smaller one of said two position signals N and Q, holding such smaller position signals for three periods of a selected one of said two position signals N and Q, and upon detection of passage through said cross-point, calculating the cross-point value C by using the positional signals Z, Y and X for the three periods thus held;

wherein the discrete values Z, Y and X are defined as the lesser signal level of the two position signals N and Q; and an AGC amplifying step of setting said cross-point value C in the AGC amplifying means so that the voltage values of said two position signals N and Q at the cross-point become amplified to said cross-point value C.

8. A method according to claim 7, wherein said cross-point value C of the two position signals N and Q is calculated in accordance with a formula:

$$C=(X+2Y-Z)/2.$$

9. A method according to claim 8, wherein:

said cross-point detecting step comprises determining an average value over a plurality of cross-point values detected during seek operation to set said average value in said AGC amplifying means.

10. A method for adjusting the positional sensitivity of a disk unit which demodulates two position signals N and Q, having a phase difference of 90°, from discrete readout signals of two-phase servo information recorded in a servo sector in a disk medium, the disc unit including:

position signal demodulating means which demodulates two position signals N and Q, having a phase difference of 90°, from discrete readout signals of two-phase servo information recorded in servo sectors in a disk medium; and cross-point level detecting means which compares levels of the two position signals N and Q discretely available from said position signal demodulating means by a seek operation at a certain speed, and calculates a cross-point value C on the basis of two smaller discrete values Z and Y immediately prior to a reversal of the size relationship between said signals and a smaller discrete value X immediately after such reversal;

said cross-point level detecting means having a first comparing means which compares levels of the two position signals N and Q and a first latch means which holds the comparison results of said first comparing means for two periods of a selected one of said position signals N and Q;

said cross-point level detecting means having a selecting means which selects a smaller one of the two position signals N and Q on the basis of the result of the comparison by said first comparing means, said cross-point level detecting means having a second latch means which holds the smaller position signals for three periods of a selected one of said two positions N and Q;

said cross-point level detecting means also having a second comparing means which compares the comparison results held in said first latch means, and when the held results are not in agreement, detects passage through the cross-point, and an operating means which, upon receipt of a detection output of passage through the cross-point by said second comparing means, calculates a cross-point value C by using position signals Z, Y and X for the three periods held in said second latch means;

said cross-point value C detected by said cross-point level detecting means being set in an AGC amplifier, so that the voltage values of said two position signals N and Q become amplified to said set value C, said method comprising:

a cross-point detecting step of comparing sizes of the signal level of two position signals N and Q during a seek operation of said disk medium, and determining a cross-point value C on the basis of two discrete values Z and Y immediately prior to reversal of the size relationship of the N and Q signals, and a discrete value X immediately after said reversal;

wherein the discrete values Z, Y and X are defined as the lesser signal level of the two position signals N and Q; and an AGC-amplifying step of setting said cross-point value C in the AGC amplifying means to amplify so that the voltage values of said two position signals N and Q at the cross-point become amplified to said cross-point value C.

11. A method according to claim 10, wherein:

said cross-point detecting step comprises determining an average value over a plurality of cross-point values detected during seek operation to set said average value in said AGC amplifying means.

* * * * *